United States Patent [19]

Bromley et al.

[11] Patent Number: 4,552,360

[45] Date of Patent: * Nov. 12, 1985

[54] VIDEO GAME WITH CONTROL OF MOVEMENT AND RATE OF MOVEMENT OF A PLURALITY OF GAME OBJECTS

[75] Inventors: Eric Bromley, West Simsbury; Robert A. Schenck, Hebron, both of Conn.

[73] Assignee: Coleco Industries, Inc., Hartford, Conn.

[*] Notice: The portion of the term of this patent subsequent to Jul. 31, 2001 has been disclaimed.

[21] Appl. No.: 579,709

[22] Filed: Feb. 13, 1984

Related U.S. Application Data

[63] Continuation-in-part of Ser. No. 430,351, Sep. 29, 1982, Pat. No. 4,462,594.

[51] Int. Cl.[4] .............................................. A63F 9/22
[52] U.S. Cl. ......................... 273/85 G; 273/DIG. 28; 273/148 B
[58] Field of Search ......... 273/85 G, DIG. 28, 148 B

[56] References Cited

U.S. PATENT DOCUMENTS

| 4,026,555 | 5/1977 | Kirschner et al. | 273/DIG. 28 |
| 4,114,882 | 9/1978 | Mau | 273/DIG. 28 |
| 4,148,485 | 4/1979 | Rains | 273/DIG. 28 |
| 4,422,639 | 12/1983 | Del Principe et al. | 273/94 |
| 4,462,594 | 7/1984 | Bromley et al. | 273/DIG. 28 |

Primary Examiner—Richard C. Pinkham
Assistant Examiner—Leo P. Picard

[57] ABSTRACT

A video game having a controller for player selection of movement of a plurality of game objects, and for controlling the rate of movement of the selected game objects.

20 Claims, 12 Drawing Figures

VIDEO GAME WITH CONTROL OF MOVEMENT AND RATE OF MOVEMENT OF A PLURALITY OF GAME OBJECTS

RELATED APPLICATIONS

This application is a continuation-in-part of copending application Ser. No. 06/430,351, U.S. Pat. No. 4,462,594 filed Sept. 29, 1982.

FIELD OF THE INVENTION

This invention relates to video games and more particularly relates to providing player control of movement of two or more game objects and/or selection of the rate of movement of an object on the display screen.

BACKGROUND OF THE INVENTION

Video games basically comprise a microprocessor utilized as a central processing unit (CPU), a video display control, a memory adapted to store a game program and a video memory for storing picture elements of a video display. The picture elements of a display are addressed and fetched from memory in accordance with the cathode ray tube (CRT) beam location.

In some cases, the system utilizes a full screen memory, that is, a discrete memory address is provided for every discrete display location of the display, either pixel position or line segment position. Such a system is disclosed in U.S. Pat. No. 4,301,503. In another type of system, a pointer indicative of a display location addresses and reads a picture element from a pattern library. Such a system is disclosed in U.S. Pat. No. 4,243,984. A video display processor (VDP), which together with a dynamic video random access memory (RAM) operates in this manner, is marketed by Texas Instruments Corporation as a 9928A video display processor.

A video game display may comprise descrete pixel positions for example of 256 positions per line and 192 lines. Thus any object may be positioned on the screen by reference to a line and column location.

To create object movement on the display, in systems using a full screen memory, the addresses of the picture elements are changed periodically, usually during the time of vertical retrace of the display. To create object movement in systems of the second type, the object location in the pointer is changed to a new display location, and the pointer addresses the object in a pattern library at the appropriate beam location.

In either case, the address of the object in the video RAM is changed by the CPU as it receives game player input as to movement of the object. Usually, a game player utilizes a joystick type instrument to control the direction of movement of an object. Such joystick may close switches indicative of coordinate directions of movement. Periodically, the CPU is responsive to the closure condition of the joystick switches. On this particular basis, or some factor thereof, the CPU will rewrite the address of the object in the video RAM. As the address of the object is periodically changed, the object appears to move on the video display in succeeding displays.

In these systems, movement of the object on the screen is at a rate determined by the game program. The object will move a predetermined number of pixels per display frame. There is no known system where rate of movement of an object may be variably selected or determined by a game player except as disclosed in copending application Ser. No. 06/430,351, filed Sept. 29, 1982. In some video games, such as disclosed in U.S. Pat. No. 4,114,882, velocity of a moving object is increased as the game continues, at the option of the players, to increase the skill level required. However, the player has no direct control of the velocity of movement of an object.

Also, a video driving game known as TURBO allows some velocity control by positioning an automobile in the horizontal coordinate one pixel per pulse where pulses are generated in accordance with positional movement of a steering wheel, and the steering wheel may be turned at a variable rate. However, this differs from one aspect of the present invention, where a binary number is generated by counting pulses as a function of a periodic signal, and utilized to control the rate of movement of a video object.

The present invention provides a new dimension in video games in providing a game player with control of movement of two or more game objects together with velocity and directional control over objects to be moved on the video screen.

SUMMARY OF THE INVENTION

The invention is embodied in a video game comprising a microprocessor which is the central processing unit (CPU) of the system, a video display processor (VDP) having a random access memory which stores video display picture elements in addresses initially derived from a game program stored in a cartridge read only memory (ROM), a system ROM which stores sub-routines and game player controllers which provide inputs to the CPU. In accordance with the invention, the game controller(s) includes a first means to permit a game player to select two or more game objects for movement, and second means, preferably in the form of a rotatable member(s), which is manipulated by a game player(s) to provide a pulse rate signal indicative of the speed of rotation of the member and also the direction of rotation. The rate signal is converted to a numerical value as a function of time, and the direction of rotation is determined. Dependent upon the program or game rules of a particular video game, the numerical value may be used to control the velocity of a moving game object, the angular orientation, or other parameters.

Generally, the numerical value representing the pulse rate is determined as a function of a periodic signal which may be a video refresh, VR, signal occurring at or after each vertical retrace. The numerical value may be established as a number per VR signals, or alternatively, the numerical value may be established as the number of VR signals per pulse signal.

The first means includes a player controller to select movement of two or more game objects depending on the type of game, and the second means allows the game player to also control the rate of movement of one or more of the selected game objects. This increases the interest in certain types of games, for example football or baseball, as hereinafter discussed.

An object of this invention is to provide a new and improved system in a video game for controlling the movement of two or more game objects.

Another object of this invention is to provide a new and improved method and apparatus for a player of a video game to have variable velocity control over one or more game objects.

A further object of this invention is to provide a new and improved apparatus and method for allowing the player of a video game to control velocity of a plurality of video display objects in addition to direction control.

The features of the invention which are believed to be novel are particularly pointed out and distinctly claimed in the concluding portion of this specification. The invention, however, together with further objects and advantages thereof, may best be appreciated by reference to the following detailed description taken in conjunction with the drawings.

DETAILED DESCRIPTION OF THE ILLUSTRATED EMBODIMENTS

Figure 1:
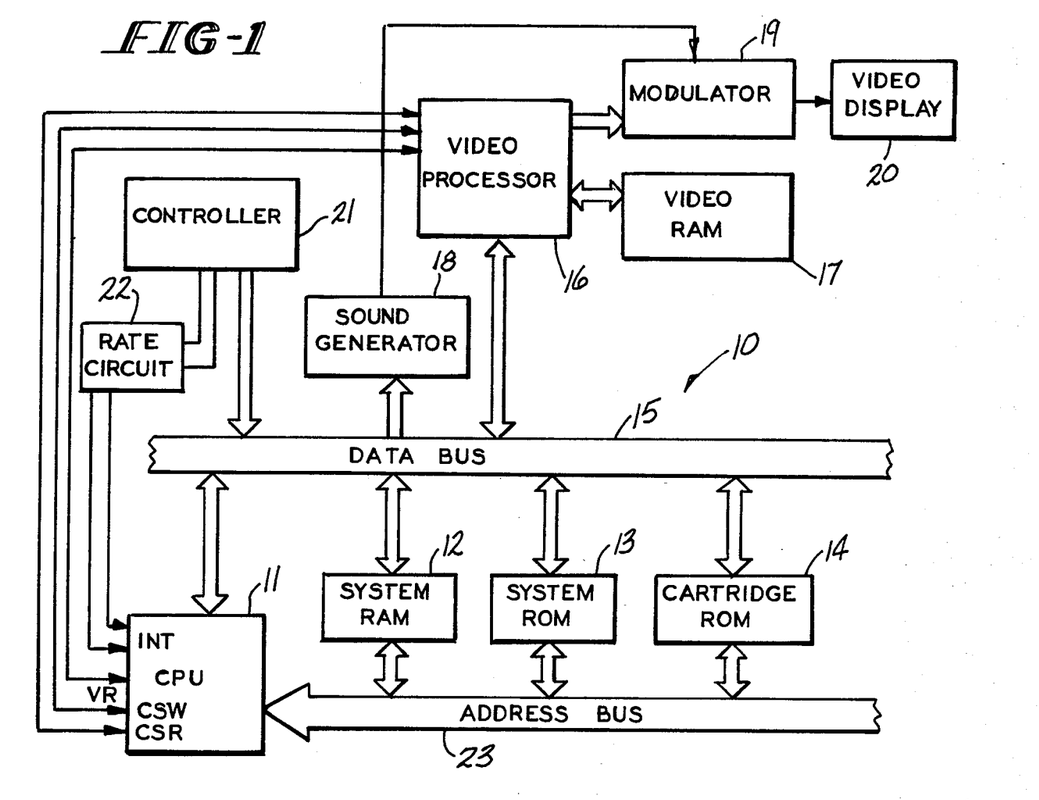
FIG. 1 is a block diagram of a video game which embodies the invention.

FIG. 1 exemplifies in block form a system 10 for creating video displays in which the invention may be embodied. The system comprises a central processing unit (CPU) 11, which may be a Zilog Z-80a microprocessor; a system random access memory (RAM) 12; a system read only memory (ROM) 13; and an input device which may be a cartridge read only memory (ROM) 14. The CPU 11 accesses all commands and game programs and supplies data over a data bus 15 to a video display processor 16 (VDP). VDP 16 has associated therewith a RAM 17 which is addressable by the CPU only through VDP 16. The system also comprises a sound generator 18, which provides an input to a modulator 19. The modulator 19 receives a scan signal from video processor 16. The modulator applies a composite video signal to a video display 20, which is a cathode ray tube display, usually a home television set. A player operated controller 21 supplies information to CPU 11, indicative of directional motion of an object to be displayed, and/or alpha-numeric keyboard information. The controller includes a direction control in the form of a joystick, as disclosed in co-pending application Ser. No. 402,435, filed July 28, 1982, now U.S. Pat. No. 4,439,648 or copending application Ser. No. 514,598, filed July 18, 1983, now U.S. Pat. No. 4,486,629 the disclosures of which are incorporated by reference. The controller includes a rate pulse generating circuit 22, which generates a pulse signal indicative of a player selected rate. This signal may be utilized independently or in conjunction with the player operated direction control. The CPU 11 will periodically update video RAM 17 when permitted to do so by the video processor 16.

Cartridge ROM 14 defines specific video images for a particular game, and the game rules. System ROM 13 contains video processing sub-routines and controller input sub-routines. The system RAM 12 contains temporary information peculiar to the particular games, such as scores, position variables, location of players, etc. CPU 11 periodically updates the image or elements of images in video RAM to be displayed in accordance with data from the controller and game program. The VDP 16 periodically permits the CPU to read from and write to the video RAM 17 upon occurrence of read (CSR) and write (CSW) signals. The CPU 11 addresses RAM 12, and ROM's 13 and 14, via an address bus 23. CPU 11 reads from RAM 12, ROM's 13 and 14, and writes to RAM 12 via data bus 15.

At the end of every video frame display, video processor 19 provides a video refresh signal VR to CPU 11. This occurs about every one-sixtieth of a second. This may be utilized as a clock signal in the present invention. Circuit 22 generates a rate signal as selected by the game player and supplies such rate signal to an interrupt terminal (INT) of CPU 11. When this occurs, CPU 11 will determine the rate, and establish a numerical representation thereof, and determine direction. Information is now stored which comprises a binary number indicative of rate as a function of the VR signal and direction of movement of a game object of member 20. This information or any part thereof may then be utilized to update the video display in accordance with the game program.

The joystick of controller 21 is adapted to close one or two of four switches which are ninety degrees apart to define eight directions of movement. Responsive to switch closure, the CPU 11 changes the addresses of one or more picture element patterns in video RAM a predetermined number of pixel positions per frame of display in accordance with the game program, or at a different rate in accordance with a velocity selected by a game player.

Figure 2:
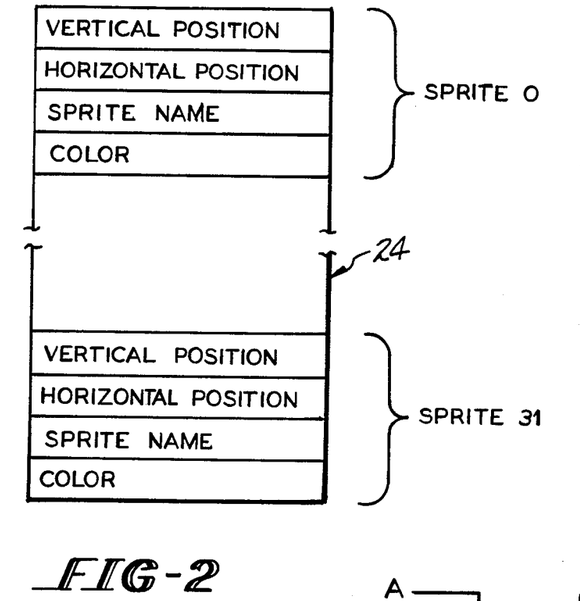
FIG. 2 is a block diagram of an attribute table entry in the video RAM of FIG. 1 showing four bytes of memory.

The video display processor is preferably a Texas Instruments Incorporated 9928A Video Display Processor, which is described in U.S. Pat. Nos. 4,243,984 and 4,262,302, and a publication of Texas Instruments Incorporated, entitled "Preliminary TMS 9928A, TMS 9929A Video Display Processors, Product Brief", the disclosures of which are incorporated herein by reference. In this system, movable objects are termed "Sprites" and are identified as shown in FIG. 2 in a sprite attribute entry in a sprite attribute table 24 in video RAM 20. The sprites are defined within a sprite pattern of eight bytes of eight pixels each, and are located on the screen in accordance with the horizontal and vertical coordinates of their sprite attribute table entry. Each sprite has an attribute table entry which gives vertical coordinate position, horizontal coordinate position, sprite name or number, and sprite color pattern. The sprite name or number is a pointer to a sprite pattern in a sprite pattern generator table or library in video RAM 20. A similar sprite, attribute entry (less color) is maintained in an object coordinate register CPU 11 or RAM 12, as hereinafter described. When the display beam location coincides with, or approaches vertical and horizontal attributes of a sprite, the name pointer is used to address the particular sprite in the sprite library for display. As shown, there are thirty-two sprites in the sprite attribute table. In accordance with the present invention up to four sprites or objects which area composite of two or more sprites may be moved by a game player.

Figure 3:
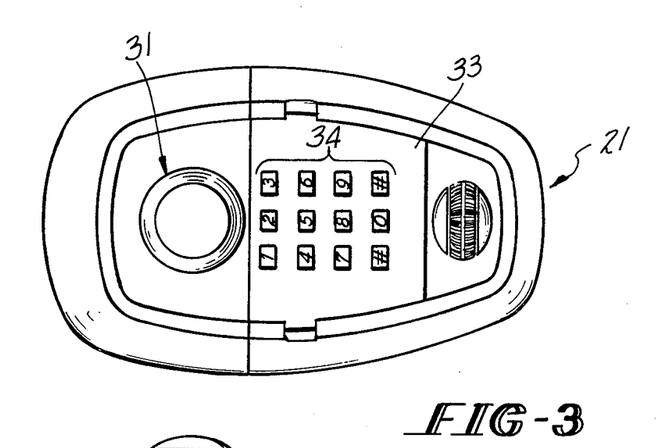
FIG. 3 is a top plan view of a video game controller useful in the practice of the invention.
Figure 4:
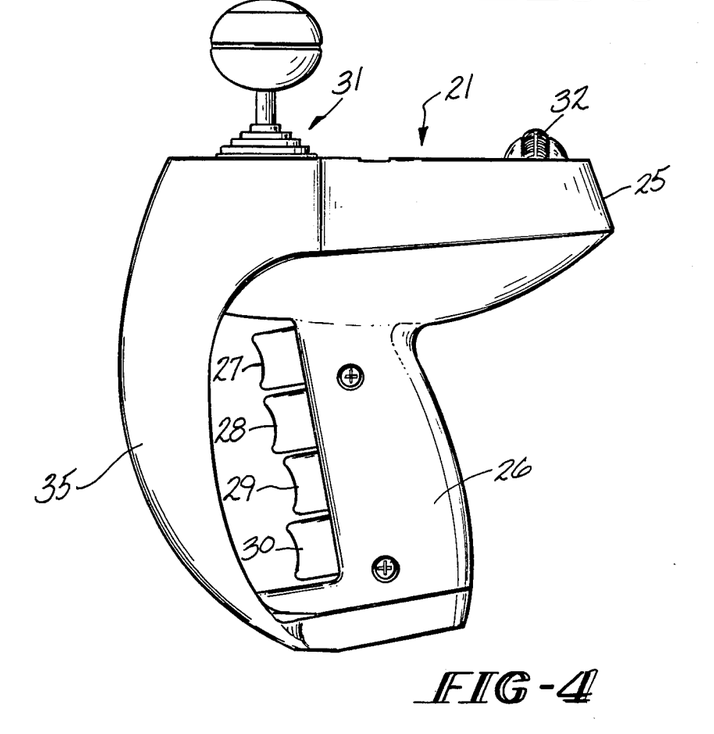
FIG. 4 is a side elevation of the device of FIG. 3.

FIG. 3 and 4 exemplify a player hand held controller 21 utilized in conjunction with the invention. Controller 21 is disclosed and claimed in copending application Ser. No. 579,711, filed Feb. 13, 1984, the disclosure of which is incorporated herein by reference.

Controller 21 comprises an upper housing 25 from which extends a pistol grip handle 26. Player operated means for selecting one or more game objects for movement in the form of four switch actuating buttons 27-30 extend from the finger side of handle 26. Each of switches 27a-30a, hereinafter described may be actuated by buttons 27-30 respectively, to produce movement of up to four sprites or game objects by one game player. Mounted in housing 25 is a joy-stick type direction controller 31 which determines direction of movement of the sprites. Joystick 31 and associated contacts comprise means for selecting direction of movement of game objects. Rotatably mounted in housing 25 is a spinner 32 which permits a game player to vary the rate of movement of a sprite or other game marker, such as a ball. Both joystick 31 and spinner 32 are supported in housing 25 and extend through an upper wall 33 thereof. A plurality of switch actuating buttons 34, which may be labeled the same as the keyboard of a touch tone telephone, also extend through top wall 33. Buttons 34, may be utilized to select a function such as game start, skill level, repeat game, etc. A mask or overlay may be placed over buttons 34 for a particular game.

A front reinforcing member 35 which also provides an asthetic appearance extends from the front of housing 25 to the bottom of handle 26

Figure 5:
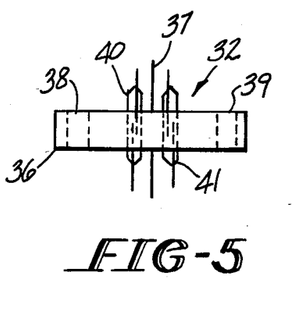
FIG. 5 is a diagram of a rotatable member which may be utilized in the invention to generate rate pulses.
Figure 6:
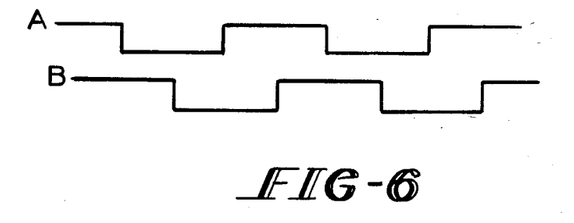
FIG. 6 is a view of the desired wave forms developed when the member of FIG. 5 is rotated.
Figure 7:
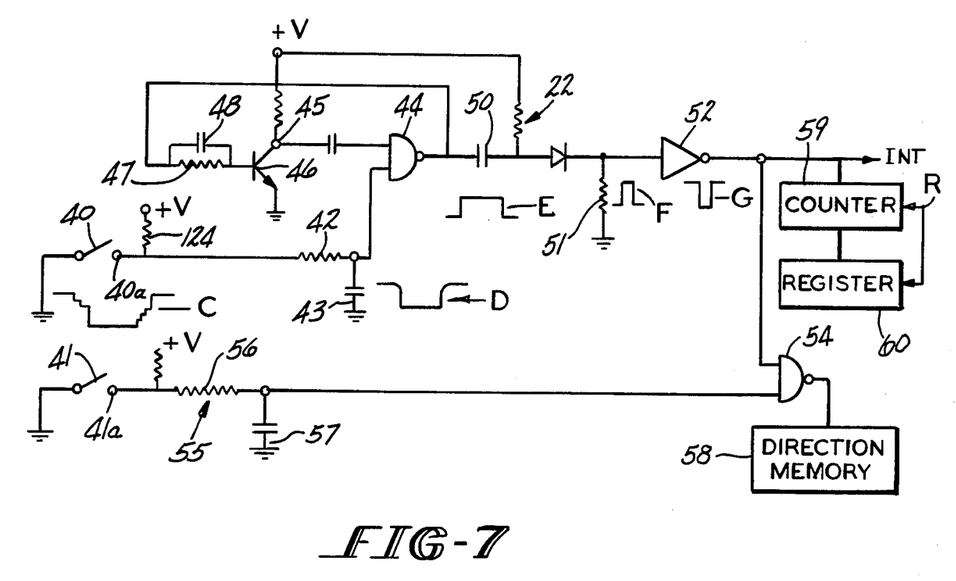
FIG. 7 is a schematic diagram of a circuit which will determine the rate of rotation of the member of FIG. 6 and the direction of rotation thereof.

A preferred player controlled pulse generating arrangement is described in FIGS. 5-7. Spinner 32 includes a non-magnetic member 36 rotatable about an axis 37 in housing 23. Member 36 carries small cylindrical magnets 38 and 39 therein on either side of axis 37. Reed switches 40 and 41 are disposed parallel to axis 37, on either side thereof as seen in plan view. The switches 37 and 38 are closed when under the influence of the field of either of the magnets.

FIG. 6 exemplifies the wave form developed by the closing of the switches 40 and 41 when the member 36 is rotated in one direction. One terminal of each of switches 40 and 41 will be grounded when the switches are closed on contacts 40a or 41a. Thus, when switch 40 is closed, A will go to a low level, as will be the case upon the closing of switch 41 to develop the trailing (as shown) signal B. The logic of the system is to determine the rate of rotation of member 36 from one of wave forms A or B, and to determine the direction of rotation by sensing which wave form is leading the other. Spinner 32 with member 36 comprises a means for providing pulses at a rate corresponding to a desired rate of movement of a game object.

Reference is now made to the rate circuit 22 of FIG. 7. When switch 40 closes, a wave form C is developed, which may have ragged leading and trailing edges due to switch bounce. Signal C is applied to an RC circuit comprising resistance 42 and capacitance 43 to remove the bounce indication and provide a signal D. Signal D is applied to a NAND gate 44 which also receives as an input a signal from the collector 45 of a transistor 46. Transistor 46 is normally conducting and therefore furnishes a low input to NAND gate 44. When the signal D is applied to NAND gate 44, there will be an output E from NAND gate 44 which is fed back through an RC circuit comprising resistance 47 and capacitance 48 to turn NAND gate 44 off after a short time delay, which determines the width of wave form E. Wave form E is applied to a differentiating circuit comprising capacitance 50 and resistance 51 to provide the wave form F, which is then inverted to pulses G by an inverter 52. The repetition rate of the pulse wave form G is indicative of the speed of rotation of member 36 and thus provides a speed or velocity rate signal.

To determine the direction of rotation, pulse G is applied to a NAND gate 54 together with a signal, or absence of signal, from switch 36. A signal from switch 36 is applied to a pulse stretching circuit 55 comprising resistance 56 and capacitance 57. If, upon occurrence of the first G pulse, the output of circuit 55 is low, gate 54 will go high. This will indicate that the B wave form of inverter 52 is low and therefore, wave form B leads wave form A. In the example set forth, this would indicate that member 36 was rotating counter clockwise. If switch 69 is not closed, the output of NAND gate 54 will be low, indicating that wave form A leads wave form B. The output of circuit 55 is also applied to NAND gate 54, together with the wave form G. If there is a coincidence of a low output from circuit 95 and wave form G, there will be an output from NAND gate 94 indicative of the fact that wave form A leads wave form B and therefore, rotation of the member 36 is clockwise. This signal from gate 54 is stored in a direction memory 58. The binary state of the memory will indicate the direction of rotation of member 36.

The pulses of the G wave form are applied to a counter 59 to determine the number of pulses per unit time as herebefore explained. The counter 59 will transfer the number therein to a velocity register 60 upon occurrence of a clock signal R. The counter 59 will then be reset.

If either of switches 40 and 41 is being closed, a train of pulses INT will appear at the output of circuit 22. At the same time, a determination is made as to the direction of rotation of member 36 and such condition is sensed by direction memory 58 which is placed in one state by the output of gate 54.

Figure 8:
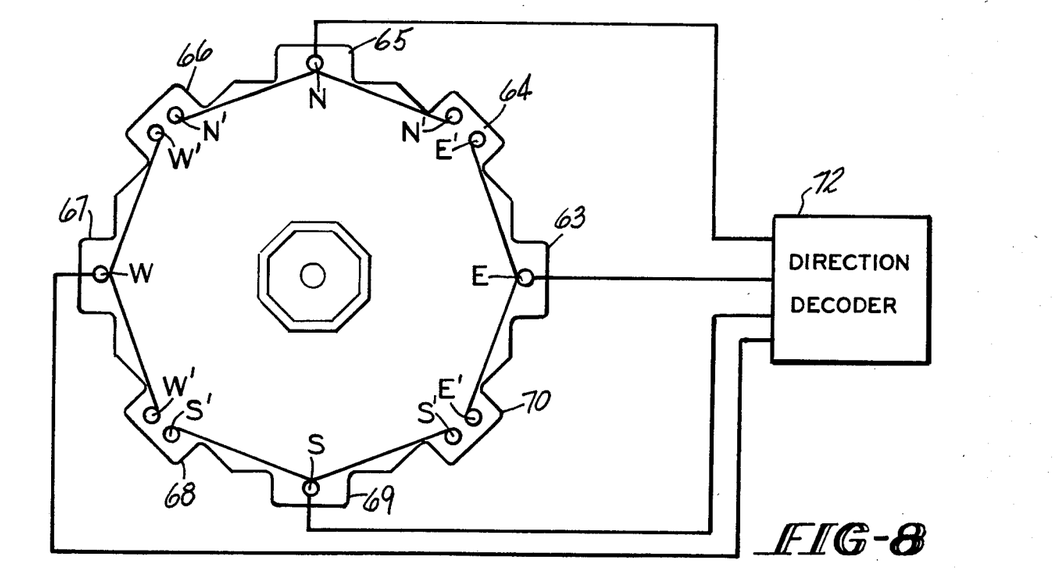
FIG. 8 is a diagram of the switch contacts of the joystick of FIG. 4.

FIG. 8 schematically exemplifies the switches of joystick 31. A flange member 62 on the bottom of joystick 31 has feet 63-70 overlying switch contacts N, S, E and W representing four cardinal directions and intermediate contacts N'E', N'W', S'E', and S'W'. As joystick 31 is tilted, one of feet 63-70 will complete an electrical circuit through one of the cardinal contacts or a pair of intermediate contacts to signify one of right angular directions. The joystick is constrained to eight degrees of tilt as disclosed in the aforementioned copending application Ser. No. 514,598 filed July 18, 1983. A direction decoder 72 decodes the switch contact closures to determine the selected direction.

Figure 9:
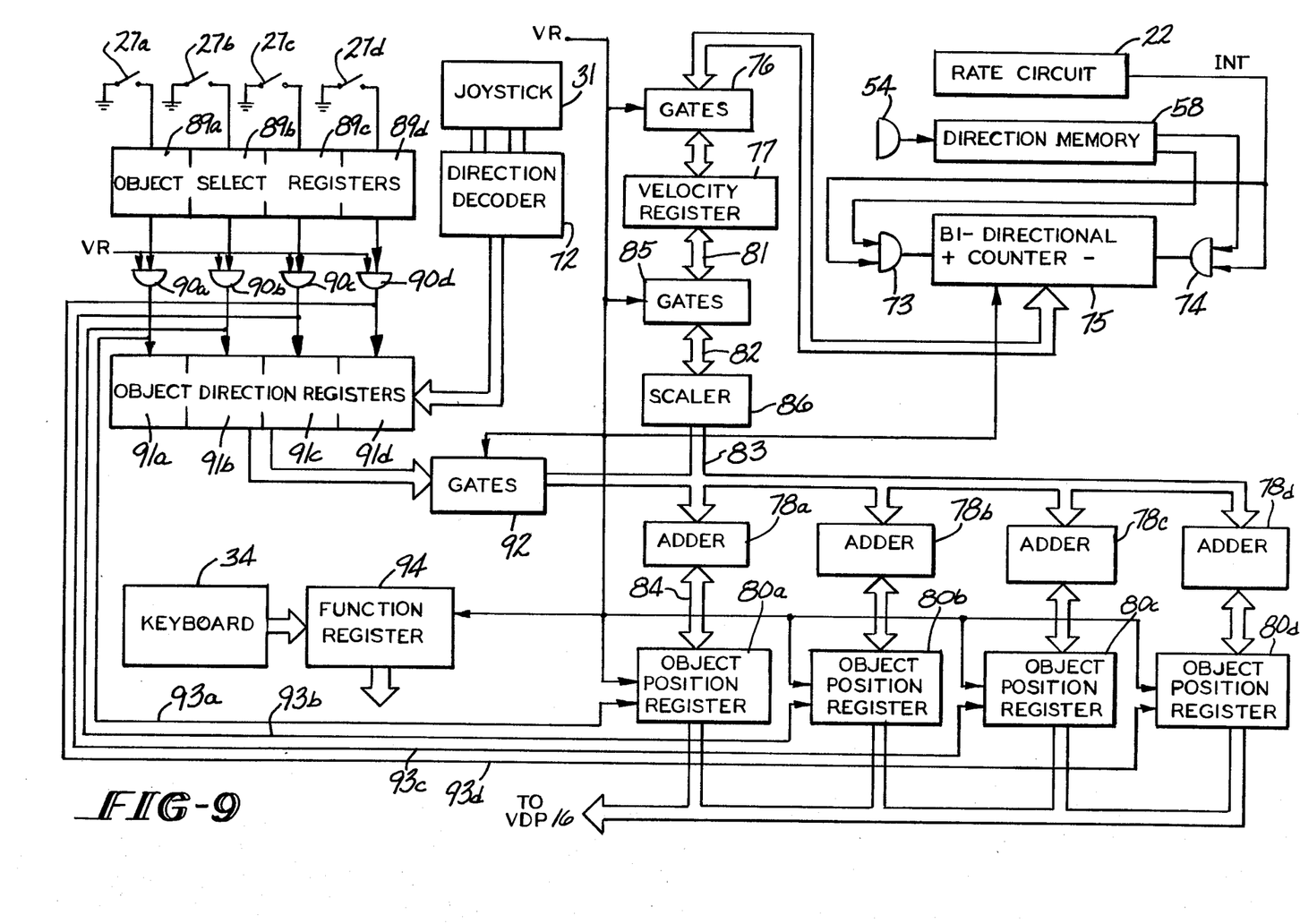
FIG. 9 is a diagram, partly schematic and partly in block form, of a network used in conjunction with the device of FIG. 3 and which establishes a number representative of velocity.

The INT signal from rate circuit 22 is applied to AND gates 73 and 74 (FIG. 9). These gates are enabled by a signal from direction memory 58 to either increment or decrement a bi-directional counter 75. Periodically, counter 75 has its content loaded into a velocity register 76 via gates 77 by means of a VR signal, and counter 75 is reset by.

Upon occurrence of the VR signal, the content of the velocity register 77 is loaded into up to four adders 78a–78d gates 79 and algebraically summed with the vertical or horizontal attributes (dependent upon game program) of the position of objects stored in object position registers 80a–80d via buses 81–84 and gates 85. A scaler 86 is optional. The results of this algebraic addition are reloaded into one or more sprite attribute registers 24 in VDP 16. The new coordinate attributes define a new display location of the sprite or game object as a function of the velocity of spinner 32. The scaling network 86 may be provided to multiply or divide the count in velocity register 63 prior to adder 65, dependent on the game program.

In this manner the vertical or horizontal attributes of a sprite or game object under player control may be varied as a function of player controlled or selected velocity.

The controller handle buttons 27–30 actuate switches 27a–27d to select one or more game objects (A–D) for movement. When these switches are closed an indication of object selection is placed in respective object select registers 89a–89d.

Each VR signal, gates 90a–90d are opened to pass an indication of an object movement selection from registers 89a–89d to an associated object direction register 91a–91d. Object direction registers also received directional information from direction decoder 72. Such information signifies the direction of each object selected by switches 27a–27d. The movement of each object selected for movement may be one pixel per VR signal, or some other number of pixels per VR signal dependent on the game program. Assuming one pixel per VR signal, each of object direction registers may contain an indication of plus or minus one pixel in the horizontal and/or vertical directions. Each VR signal these indications are transferred through gates 92 to adders 78a–78d to be algebraically added to the coordinates in object position registers 80a–80d.

The output of gates 90a–90d are applied via lines 93a–93d to object position registers 80a–80d to enable or to inhibit change of the position coordinates stored therein dependent on player movement selection by switches 27a–27d.

Upon a CPU write to VDP cycle (CSW) the contents of position register 80a–80d are transferred to corresponding sprite attribute entries (FIG. 2) in the sprite attribute table in video RAM 20 through VDP 16 via bus 15.

The circuitry illustrated in FIG. 9, other than the switches and pulse shapers, may be established in the CPU by the game program in the illustrated form or any other form which performs the desired logic. The position registers 80a–80d as well as the other registers may be in the system RAM 12.

In the manner described, the vertical and/or horizontal address of a sprite is changed in the video RAM a number of pixels each VR occurrence dependent upon the rate at which the player rotates member 36. The observed velocity of the object will be dependent upon the number of pixel address changes each display frame.

If an INT signal is occurring but at a rate less than VR, the VR signal may be applied as input to counter 75 and the INT signal used as a reset and gating signal. Dependent upon the game program, this arrangement may be used to change the angular position of a game object, or to slow down a movement of an object from a game programmed rate. An arrangement for detecting the VR signal as a function of the INT signal is hereinafter described.

Figure 10:
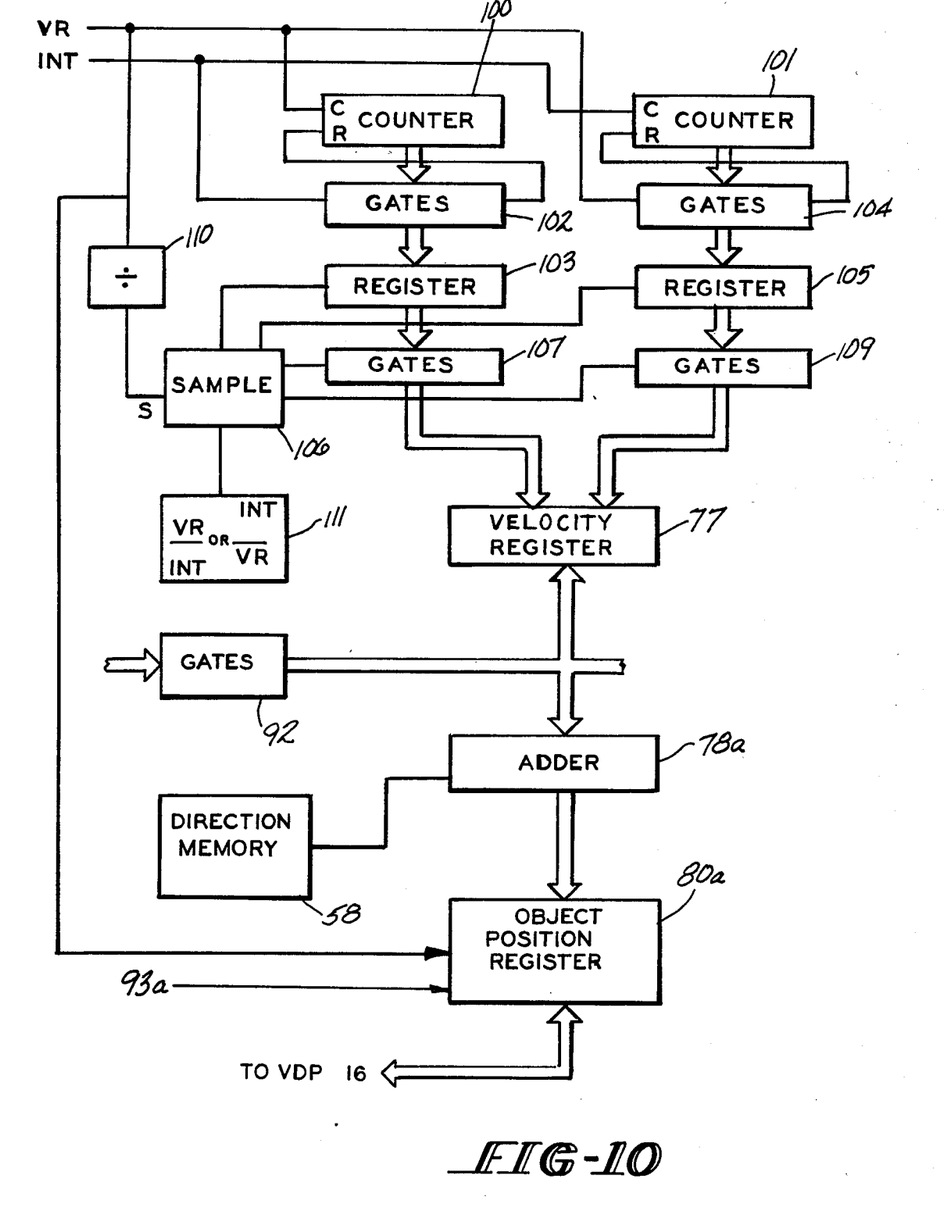
FIG. 10 is a block diagram of another circuit for determining rate and direction.

Reference is now made to FIG. 10, which discloses another technique of determining a velocity number and direction from the INT signal from rate circuit 22. To determine the rate of rotation of member 36, INT pulses are compared with a reference clock signal, which may be the VR signal. The VR signal is applied as a clock signal C to a first counter 100, and as a reset signal R to a second counter 101.

In operation, the VR signal will clock counter 100 until the occurrence of an INT signal. The INT signal transfers the content of counter 100 through gates to a storage register 103. After the parallel transfer, the INT signal resets counter 100.

The INT signal will clock counter 101 until a VR signal occurs, which transfers the content of counter 101 through gates 104 to a storage register 105. The contents of either register 103 or 105 may then be transferred to a data register. This is determined by a sample circuit 106. Sample circuit 106 samples the contents of one of the registers 103 or 105 (both shown as being sampled). Assume register 105 is sampled by circuit 106, and if it is zero, will apply a load signal to gates 107 to load the contents of register 103 into velocity register 77 (same as FIG. 9). If the content of register 105 is not zero, then such content is loaded through gates 109 into velocity register 77.

Where the repetition rate of the INT pulses is less than that of VR, the number appearing in velocity will be inversely proportional to the speed of rotation of the rotatable member. Where the repetition rate of the INT pulses is greater than that of VR, the number appearing in velocity register 77 will be directly proportional to the speed of rotation. Sample circuit 106 may sample one of registers 103 or 105 at a rate less than that of the VR signal. Such sampling signals S may be derived from any convenient timing signal in the system. As shown, the sample signal S is derived by division of the frequency of the VR signal by a counter 110. A memory 111 in the form of a flip-flop may store an indication of which of registers 103 or 105 contained a rate signal. The circuit of FIG. 10 may be formed in the central processing unit of the video game by the game program or may be external thereto. The game program may determine which function VR/INT or INT/VR will be used.

The number stored in velocity register 77 will be updated periodically and acted upon by the central processing unit of the video game to update the video display dependent upon the game program.

The number in register 77 may be utilized as previously described to be algebraically added to an object position attribute in adder 78a. In this embodiment, the sign of the addition is determined from direction memory 47.

For simplicity of illustration only one adder 78a and one object position register 80a are shown in FIG. 10. It is to be understood that the system of FIG. 10 includes adders 78b–78d, object position registers 80b–80d, and all the circuitry of FIG. 9 providing directional data inputs to gates 92. As shown above, the invention may be implemented using various devices operable by a game player. It is only necessary to provide a device which the player may manipulate to generate rate pulses. A chosen direction may be determined from the rate control device or from the direction controller. The logic may be implemented in various manners, as well as those specifically disclosed.

A system as shown in FIGS. 9 or 10 will be duplicated for two players in a video game.

For purposes of disclosure, the system has been described as using the video refresh signal VR as a clock signal. However, any source of clock signals may be utilized.

Each of object select registers 89a–89d may comprise a flip-flop or other storage circuit which is in a given state responsive to one of switches 27a–27d.

Each of the object direction registers may comprise four flip-flops, each responsive to coincidence of an input from one of gates 90a–90d and a direction signal from direction decoder 72. The set conditions of the flip-flop(s) of each of registers 91a–91d will indicate selected direction(s) of movement. The set flip-flop(s) will be reset if a selected object selection switch 27a–27d is released or if joystick 31 is tilted in another direction.

The adders 78a–78d actually may comprise two bi-directional adders, one for each coordinate direction. The maximim rate of movement which can be achieved is determined by the numerical capacity of velocity register 77. This will determine the maximum change in pixel position of a game object per display frame.

Figure 12:
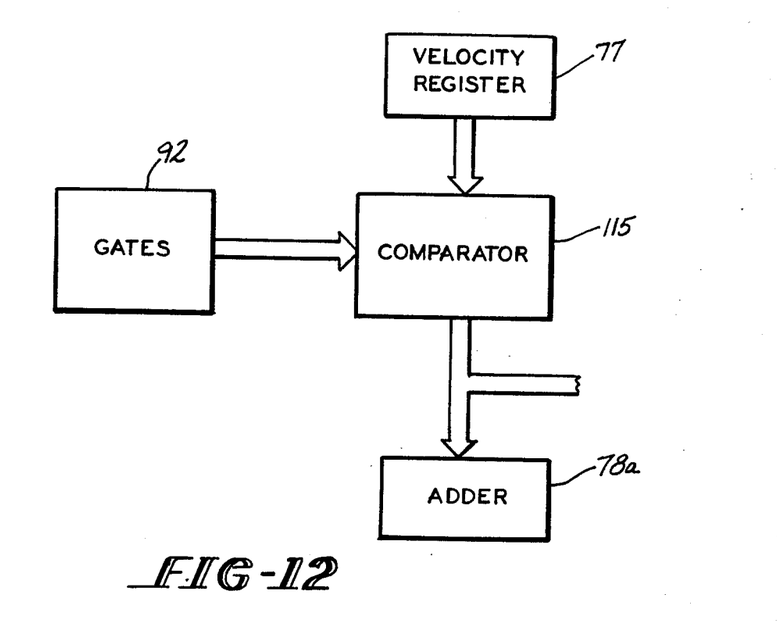
FIG. 12 is a block diagram of a modification of a portion of FIG. 9.

The adders 78a–78d may be arranged to accept an input from velocity register 77 only if the player controlled velocity of object movement is greater than that prescibed by the game program. Alternatively, a comparator 115 (FIG. 12) may receive the outputs of the object direction registers 91a–91d through gates 92 and the output of velocity register 77 and apply only the higher number to adders 78a–78d. Also, comparator 115 may be programmed to select the lower number.

Figure 11:
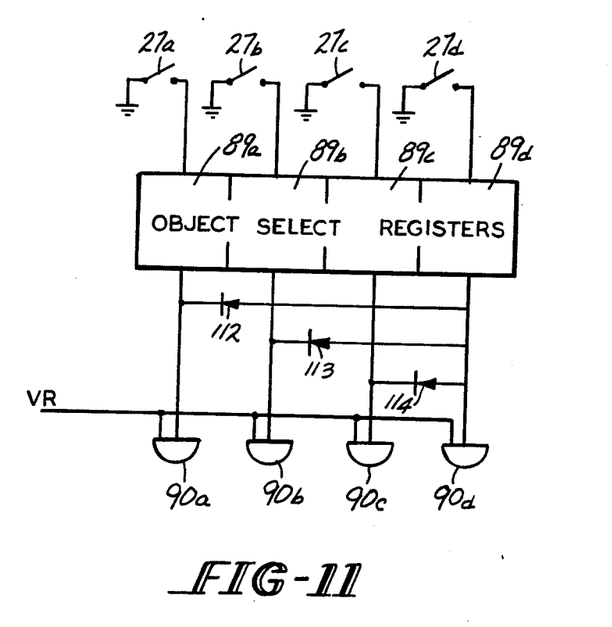
FIG. 11 is a diagram of a modification of a portion of the network of FIG. 9.

The switches 27a–27c may be arranged to move three individual objects, while switch 27d is arranged to move all four objects. This may easily be accomplished by insertion of diodes 112, 113, 114 as shown in FIG. 11, and may be set by the game program.

Once a game object(s) has been selected and joystick 31 tilted to choose a direction of movement, the direction of movement is stored in the selected object direction register 90a–90d until the object select switches 27a–27d have been released or a new direction is selected by joystick 31.

The modes of operation of the system may be exemplified in conjunction with a football game where the moving objects are four backfield players and a football on a football field. Directional movement of the players is controlled by the joystick. Directional movement of the ball is controlled by the game program as selected by the keyboard function switches 34. The keyboard is also used to select game options, skill level, play patterns, play execution and hiking count.

If the game player depresses and holds player select switch 27a and tilts the joystick 31, the quarterback moves in the selected direction. If switch 27b is depressed and held and joystick 31 is tilted, the left halfback moves in the selected direction. If switch 27c is depressed and held and joystick 31 tilted, the right halfback moves in the indicated direction. If switch 27d is depressed (using the circuit of FIG. 11) and joystick 31 is tilted, all players move in the indicated direction.

If switches 27a and/or 27b and/or 28b are depressed and held and joystick 31 tilted, the quarterback and/or left halfback, and/or right halfback move in direction indicated. The foregoing movements will be at a rate determined by the game program, and skill level, if applicable.

If a player select switch is depressed and held, joystick 31 tilted and released, and spinner 32 rotated at a sufficient rate and released, the game object will accelerate in the direction selected, and then decelerate to the game program speed. If the spinner is rotated continuously at a high rate, the game object will accelerate to a maximum rate of movement and maintain such maximum rate until the spinner is stopped.

Once one or more game objects have been selected for movement and the direction of movement chosen, the selected game objects will continue movement in the chosen direction, even though joystick 31 is released, until the object selection switches are released or another direction is chosen.

In a video baseball game, the game player is able to control runners on three different base runners as well as the batter when at bat. When the game player's team is in the field, the selection switches 27a–27d may be utilized to select different types of pitches, for example, straight pitch, inside curve, curve down and outside, or change-up. After the type of pitch has been selected, joystick 31 may be manipulated to make the pitched ball go inside, outside, or tend to drop. The game object selection switches 27a–27d may be closed to select movement of the first baseman (27a), second baseman (27b), shortstop (27b and 27c), third baseman (27c), and catcher (27d). In this application, another object position register would be utilized together with associated circuitry.

Using the number of object selection switches 27a–27d disclosed, the game player representing the batting team may select action by the batter, or a runner on each of the three bases.

The video game system disclosed provides the game players with wide versatility in controlling game objects resulting in much more interesting games.

It may thus be seen that the objects of the invention set forth as well as those made apparent from the foregoing description are efficiently attained. Modifictions to the disclosed embodiments of the invention, as well as other embodiments thereof, may occur to those skilled in the art. Accordingly, the appended claims are intended to cover all embodiments of the invention and modifications to the disclosed embodiments do not depart from the spirit and scope of the invention.

What is claimed is:

1. A method of operating a video game to control movement of a plurality of game objects on a video display where digital representations of the display positions of said plurality of game objects are stored in addressable locations in a memory and read from said memory locations for display in accordance with the beam location on the video display, comprising the steps of providing a player controller having means for selecting a plurality of game objects for movement,
establishing a position register for each of said plurality of game objects where said position registers store the display position of said movable game objects,
generating clock pulses,
providing means for player selection of direction of movement of said game objects,
periodically updating the position registers of said game objects as a function of said means for game object selection, said means for selection of direction and said clock pulses, and periodically changing the position data of said game objects in said memory in accordance with the display position in said position registers.

2. The method of claim 1 further including the steps of providing a player controlled means of generating rate pulses for controlling the rate of movement of said game objects on the display, and additionally changing the position denoted in said position registers as a function of said rate pulses.

3. The method of claim 1 wherein said position registers define the game object positions in coordinates, and the coordinates of each position register are periodically updated, as a function of said means for selecting game objects and said means for player selection.

4. The method of claim 1 wherein said means for selecting comprises a plurality of means for selecting movement of said plurality of game objects and one of said plurality of means selects all game objects for movement.

5. The method of claim 1 wherein said means for selecting comprises a plurality of selection switches and comprising the further steps of providing an object selection register for each object to be independently moved, providing a direction register for each object to be independently moved which is responsive to an object selection register and said player selection of direction of movement means.

6. A method of operating a video game to control movement of a plurality of game objects on a video display where digital representations of the display positions of said plurality of game objects are stored in addressable locations in a memory and read from said memory locations for display in accordance with the beam location on the video display, comprising the steps of providing a plurality of player operated game object selection means for selecting any of a plurality of game objects for movement, providing player operated direction selection means for selecting a direction of movement for the selected objects, generating rate pulses having a repetition rate proportional to the desired velocity of the selected game objects, providing a plurality of game object position registers corresponding to the selectable game objects, said object position registers including digital representations of the coordinate positions on the video display where selected game objects are to be displayed.

generating a train of clock pulses, periodically changing the digital representations of the positions of the selected game objects in said position registers as a function of said clock pulses and said direction selection means, or as a function of said rate pulses, and periodically changing the digital position data of said game objects in said memory in accordance with the digital representations of the selected game objects in said position registers.

7. The method of claim 6 where the digital representations of the positions of the selected game objects in said position registers are changed as a function of only one of said rate pulses and said clock pulses and said direction selection means.

8. The method of claim 6 wherein said means for selecting comprises a plurality of means for selecting movement of said plurality of game objects and one of said plurality of means selects all game objects for movement.

9. A method of operating a video game to control movement of a plurality of game objects on a video display where digital representations of the display positions of said plurality of game objects are stored in addressable locations in a memory and read from said memory locations for display in accordance with the beam location on the video display, comprising the steps of providing a plurality of game object selection means, providing a game object direction register for each selectable game object, providing direction of movement selection means, applying signals indicative of the game objects selected for movement by said object selection means and signals indicative of the direction of movement selected by said direction of movement selection means to said game object direction registers to establish the direction of movement of each selected game object, providing a source of clock pulses, providing a position register for each of said plurality of game objects, said position registers each containing a numerical representation of the position of one of said game objects for display, periodically updating the numerical position in each position register as a function of said clock pulses and the information in said object direction registers, and periodically changing the position data of said game objects in said memory in accordance with the numerical representation in said position registers.

10. The method of claim 9 further including providing a player operated means for generating pulses proportional to a desired rate of movement of selected game objects on said display, periodically establishing a number proportional to the rate of said rate signals, and periodically updating the numerical representation of object position in said position registers corresponding to game objects selected for movement as a function of said established number, and direction of movement selected by said direction of motion selection means.

11. The method of claim 9 further including the steps of providing a player controlled means of generating rate pulses for controlling the rate of movement of said game objects on the display, and additionally changing the position denoted in said position registers as a function of said rate pulses.

12. The method of claim 9 wherein said position registers define the game object positions in coordinates, and the coordinates of each position register are periodically updated, as a function of said means for selecting game objects and said means for player selection.

13. The method of claim 9 wherein said means for selecting comprises a plurality of means for selecting movement of said plurality of game objects and one of said plurality of means selects all game objects for movement.

14. In a video game which comprises a memory adapted to store at addressable locations numerical positional data of locations of a plurality of game objects on a video display which are movable under player control, and the game objects are read out for display in accordance with the beam location on the video display, a player operated directional control for selecting direction of movement of a game object, the improvement comprising,     player operated means for selecting one or more game objects for movement, a plurality of game object direction registers, said direction registers being responsive to said direction control and said means for selecting game objects to establish an indication of each game object selected for movement and the direction of movement thereof,     a plurality of game object position registers each adapted to store a numerical indication of the positon of a game object,     a source of clock pulses, and means responsive to the indications in said direction registers and said clock pulses for periodically updating the game object numerical indications of selected game objects in said position registers, said numerical indications of the display positions of said plurality of objects in said memory being periodically updated in accordance with the numerical indications in corresponding position registers to produce movement of said selected game objects on said display on successive display frames.

15. The video game of claim 14 further including player operated means for providing pulses at a rate corresponding to a desired rate of movement of a game object on the video display, means responsive to said rate pulses for establishing a numerical representation of the rate of said pulses, and means responsive to said numerical representation and said direction selection means for periodically updating the numerical indications of the position of selected game objects in said position registers.

16. The video game of claim 14 wherein said player operated direction selection means comprises a joystick tiltable to close contacts indicative of direction, a housing member, said joystick and said contacts being mounted in said housing, said housing including a pistol grip type handle, said player operated game object selection means comprising a plurality of switches and actuating buttons therefor mounted in said handle, said player operated means for providing pulses comprising a member rotatably mounted in said housing from producing switch closures at a rate proportional to rotation thereof.

17. A method of operating a video game to control the velocity of movement of a game object on a video display where a digital representation of at least one game object is stored in addressable locations in an addressable memory and read out from memory locations for display in accordance with the beam location of the video display, comprising the steps of generating rate pulses having a repetition rate proportional to the desired velocity of the game object, generating clock pulses, counting one of said rate pulses and said clock pulses as a function of the other and establishing a numerical representation of said function, said numerical representation being indicative of a desired velocity of movement of an object to be displayed on said video display, and periodically changing the address of said object in said memory in accordance with said numerical representation.

18. The method of claim 17 where said clock signal is a video refresh signal, and the address of said object in said memory is changed as a function of said video refresh signal.

19. The method of claim 17 where said step of generating pulses comprises providing a player rotatable member and generating pulses at a rate proportional to rate of rotation of said member.

20. The method of claim 19 further including the step of detecting the direction of rotation of said member and changing the address of said object in said memory as a function of the direction of rotation of said member and the numerical representation.

* * * * *